(12) United States Patent
Kumar et al.

(10) Patent No.: US 12,258,960 B2
(45) Date of Patent: Mar. 25, 2025

(54) KEYLESS GEAR TIMING ASSEMBLY FOR A RECIPROCATING PUMP

(71) Applicant: SPM Oil & Gas Inc., Fort Worth, TX (US)

(72) Inventors: Chandu Kumar, Fort Worth, TX (US); Jeffrey Haiderer, Fort Worth, TX (US); Connor Landrum, Burleson, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 163 days.

(21) Appl. No.: 18/040,018

(22) PCT Filed: Aug. 10, 2021

(86) PCT No.: PCT/US2021/045400
§ 371 (c)(1),
(2) Date: Jan. 31, 2023

(87) PCT Pub. No.: WO2022/035870
PCT Pub. Date: Feb. 17, 2022

(65) Prior Publication Data
US 2023/0304483 A1  Sep. 28, 2023

Related U.S. Application Data

(60) Provisional application No. 63/063,579, filed on Aug. 10, 2020.

(51) Int. Cl.
*F04B 9/02* (2006.01)
*F16D 1/06* (2006.01)

(52) U.S. Cl.
CPC .................. *F04B 9/02* (2013.01); *F16D 1/06* (2013.01); *F16D 2001/062* (2013.01); *F16D 2300/12* (2013.01)

(58) Field of Classification Search
CPC ... F16D 1/093; F16D 1/091; F16D 2001/0906
See application file for complete search history.

(56) References Cited

U.S. PATENT DOCUMENTS 2,277,331 A    3/1942  Kysor
3,847,495 A *  11/1974 Peter ...................... F16D 1/093
                                                     403/370

(Continued)

FOREIGN PATENT DOCUMENTS

DE           3833350 A1    4/1990
DE       102008031759 A1   1/2009
WO     WO-2015135818 A1 *  9/2015  ........... B21B 35/141

OTHER PUBLICATIONS

USPTO Machine Translation (retrieved from FIT database) of the Description of DE 3833350 A1, Muellenberg, Apr. 5, 1990. (Year: 2024).*

(Continued)

*Primary Examiner* — Daniel D Yabut (57) ABSTRACT

A keyless timing gear assembly for securing a bull gear to a crankshaft of a power end of a reciprocating pump assembly, the keyless timing gear assembly including at least one actuator, an expansion member and at least one wedge member disposed between the at least one actuator and the expansion member, the wedge member having a sloped surface to slideably engage a corresponding sloped surface on the expansion member such that, in response to actuation of the at least one actuator, the at least one wedge member exerts a force on the expansion member for securing a bull gear to a crankshaft.

20 Claims, 6 Drawing Sheets

(56) References Cited

U.S. PATENT DOCUMENTS

| | | | | |
|---|---|---|---|---|
| 4,268,185 | A | | 5/1981 | Müllenberg |
| 5,123,771 | A | | 6/1992 | Okuno |
| 5,188,480 | A | * | 2/1993 | Okuno ............... F16D 1/094 403/370 |
| 5,302,062 | A | * | 4/1994 | Baba ............... F15B 15/262 279/4.09 |
| 8,083,504 | B2 | * | 12/2011 | Williams ............ F04B 15/02 417/523 |
| 2009/0092510 | A1 | * | 4/2009 | Williams ............ F04B 1/00 417/521 |

OTHER PUBLICATIONS

International Search Report and Written Opinion issued in Application No. PCT/US2021/045400; Dated Dec. 3, 2021, 13 Pages.

* cited by examiner

KEYLESS GEAR TIMING ASSEMBLY FOR A RECIPROCATING PUMP

CROSS-REFERENCE TO RELATED APPLICATIONS

This patent application is a 371 national stage of PCT Application No. PCT/US2021/045400 filed on Aug. 10, 2021, entitled "KEYLESS GEAR TIMING ASSEMBLY FOR A RECIPROCATING PUMP," which claims priority to U.S. Provisional Application No. 63/063,579, filed on Aug. 10, 2020, entitled "KEYLESS GEAR TIMING FOR RECIPROCATING PUMP," and assigned to the assignee hereof. The disclosures of the prior applications are considered part of and are incorporated by reference into this patent application.

FIELD

This disclosure relates to reciprocating pump assemblies, in particular, to a power end of a reciprocating pump assembly, and even more particularly, to a keyless gear timing assembly for a power end of a reciprocating pump assembly.

BACKGROUND

Large pumps are commonly used in mining and oilfield applications, such as during hydraulic fracturing and stimulation operations. During a hydraulic fracturing operation, fracturing fluid (i.e., water, mud, frac sand or proppant, and other materials) is pumped at high pressures into a wellbore to cause the producing formation to fracture. High pressure reciprocating pumps, like the SPM® QW2500 XL or EXL frac pump, the Destiny™ TWS 2500 frac pump, or the SPM® QEM 3000 Continuous Duty Frac Pump, manufactured by S.P.M. Flow Control, Inc. of Fort Worth, Texas, are favored due to their capability to produce high pressure and high volume flow. In operation, the fracturing fluid is caused to flow into and out of a pump fluid chamber as a consequence of the reciprocation of a piston-like plunger respectively moving away from and toward the fluid chamber. As the plunger (aka plunger rod) moves away from the fluid chamber, the pressure inside the chamber decreases, creating a differential pressure across an inlet valve, drawing the fracturing fluid through the inlet valve into the chamber. When the plunger changes direction and begins to move towards the fluid chamber, the pressure inside the chamber substantially increases until the differential pressure across an outlet valve causes the outlet valve to open, enabling the highly pressurized fracturing fluid to discharge through the outlet valve into the wellbore.

In many reciprocating pumps, multiple plungers are used to smooth the output flow rate and pressure, and to improve power efficiency. The multiple plungers are often driven by a common crankshaft, with the plungers positioned at different axial locations of the crankshaft. The load resistance and bending moments vary along the length of the crankshaft, leading to mechanical stress. To minimize the stress within the crankshaft, it is desirable to power both ends of the crankshaft in synchrony, which more evenly distributes power and thereby minimizes the different bending moments or load resistance along the crankshaft.

This may be accomplished by employing a bull gear on each end of the crankshaft. However, due to the manufacturing tolerances involved in the creation of each part of a pump, each pump is unique and the small differences in part sizes must be accounted for. In such an arrangement, the two bull gears must be carefully synchronized to avoid creating the stresses with the crankshaft this arrangement seeks to avoid. Timing the bull gears accurately can be a difficult and time consuming process. Therefore there is a need for a keyless gear timing device that will facilitate the synchronizing of bull gears without costly manual correction.

SUMMARY

According to a first aspect, there is provided a keyless timing gear assembly for securing a bull gear to a crankshaft of a power end of a reciprocating pump assembly. The crankshaft is configured to drive one or more plungers in a fluid end of the reciprocating pump assembly, with a first bull gear connected to a first end of the crankshaft and a second bull gear connected to a second and opposed end of the crankshaft. A pinion shaft is mechanically coupled to the first bull gear and the second bull gear via first and second pinion gears, respectively, the pinion shaft operable to rotate the pinion gears, and in turn, rotate the first and second bull gears to rotate the crankshaft. The keyless timing gear assembly including at least one actuator, an expansion member and at least one wedge member disposed between the at least one actuator and the expansion member, the wedge member having a surface to slideably engage a corresponding surface on the expansion member such that, in response to actuation of the at least one actuator, the at least one wedge member exerts a force on the expansion member for securing the first bull gear to the crankshaft.

In some embodiments of the keyless timing gear assembly, the wedge member may be a ring.

According to other embodiments, the at least one actuator is a threaded fastener threadedly coupled to the wedge member.

In still other embodiments, the keyless timing gear assembly includes a second wedge member, the second wedge member having a surface to slideably engage a corresponding surface on the expansion member such that, in response to actuation of the at least one actuator, the second wedge member exerts a force on the expansion member for securing the first bull gear to the crankshaft.

In some embodiments, in response to actuation of the at least one actuator, the distance between the wedge members decreases.

In still other embodiments, at least a portion of the expansion member is integrally formed with either the bull gear or the crankshaft.

In yet other embodiments, the at least one actuator is three actuators symmetrically positioned around a center axis of crankshaft.

According to some embodiments, the at least one actuator comprises a hydraulic actuator having a channel in fluid communication with the wedge member such that, in response to fluid pressure in the hydraulic channel, the wedge member slidably engages the expansion member to cause the bull gear to frictionally engage the crankshaft.

In yet other embodiments, the expansion member is a second wedge ring hydraulically coupled to the hydraulic actuator through the fluid channel.

According to a second aspect, there is provided a power end for a reciprocating pump assembly where the power end includes a crankshaft configured to drive one or more plungers in a fluid end. A first bull gear is connected to a first end of the crankshaft and a second bull gear connected to the crankshaft spaced apart from the first bull gear. A pinion shaft is mechanically coupled to the first bull gear and the second bull gear via first and second pinion gears, respectively, the pinion shaft operable to rotate the pinion gears, and in turn, rotate the first and second bull gears to rotate the crankshaft. A keyless timing gear assembly is provided for securing the first bull gear to the crankshaft, in which the keyless timing gear assembly includes at least one actuator, an expansion member, and at least one wedge member disposed between the at least one actuator and the expansion member. The wedge member has a surface to slideably engage a corresponding surface on the expansion member such that in response to actuation of the at least one actuator, the at least one wedge member exerts a force on the expansion member for securing the first bull gear to the crankshaft.

According to some embodiments, a shaft key is configured to couple a second bull gear to the crankshaft, wherein the first bull gear is synchronized to the second bull gear and locked onto the crankshaft after the second bull gear is fastened onto the crankshaft using the shaft key. The first bull gear and the second bull gear are of the same diameter and are synchronized to provide even power input to the crankshaft.

In other embodiments, the at least one actuator is a fastener threadedly coupled to the wedge member.

According to other embodiments, the wedge member is a ring.

In still other embodiments, a second wedge member is provided that has a surface to slideably engage a corresponding surface on the expansion member such that, in response to actuation of the at least one actuator, the second wedge member exerts a force on the expansion member for securing the first bull gear to the crankshaft.

In still other embodiments, in response to actuation of the at least one actuator, the distance between the wedge members decreases.

According to yet another embodiment, at least a portion of the expansion member is integrally formed with either the bull gear or the crankshaft.

In still other embodiments, the at least one actuator is a threaded fastener threadedly coupled to the wedge member.

According to a third aspect of the present invention, there is provided a method for synchronizing two bull gears spaced apart on a crankshaft in a power end of a reciprocating pump assembly. The method includes, having a reciprocating pump having a crankshaft and a pinion shaft installed, securing a first bull gear to the crankshaft and securing a second bull gear to the crankshaft spaced apart from the first bull gear, wherein securing the second bull gear includes actuating at least one actuator of a keyless gear timing assembly such that in response to actuation, at least one wedge member exerts a radial force on an expansion member for securing the second bull gear to the crankshaft to enable the first bull gear to rotate in synchrony with the second bull gear.

According to some embodiments, securing the first bull gear to the crankshaft also includes installing the first bull gear onto the crankshaft using a key. In some embodiments, the first bull gear is installed onto the drive side of the crankshaft and the second bull gear is installed on the non-drive side of the crankshaft.

Other aspects, features, and advantages will become apparent from the following detailed description when taken in conjunction with the accompanying drawings, which are a part of this disclosure and which illustrate, by way of example, principles of the inventions hereof.

DESCRIPTION OF THE FIGURES

The accompanying drawings facilitate an understanding of the various embodiments.

Like numerals refer to like elements.

DETAILED DESCRIPTION

Figure 1:
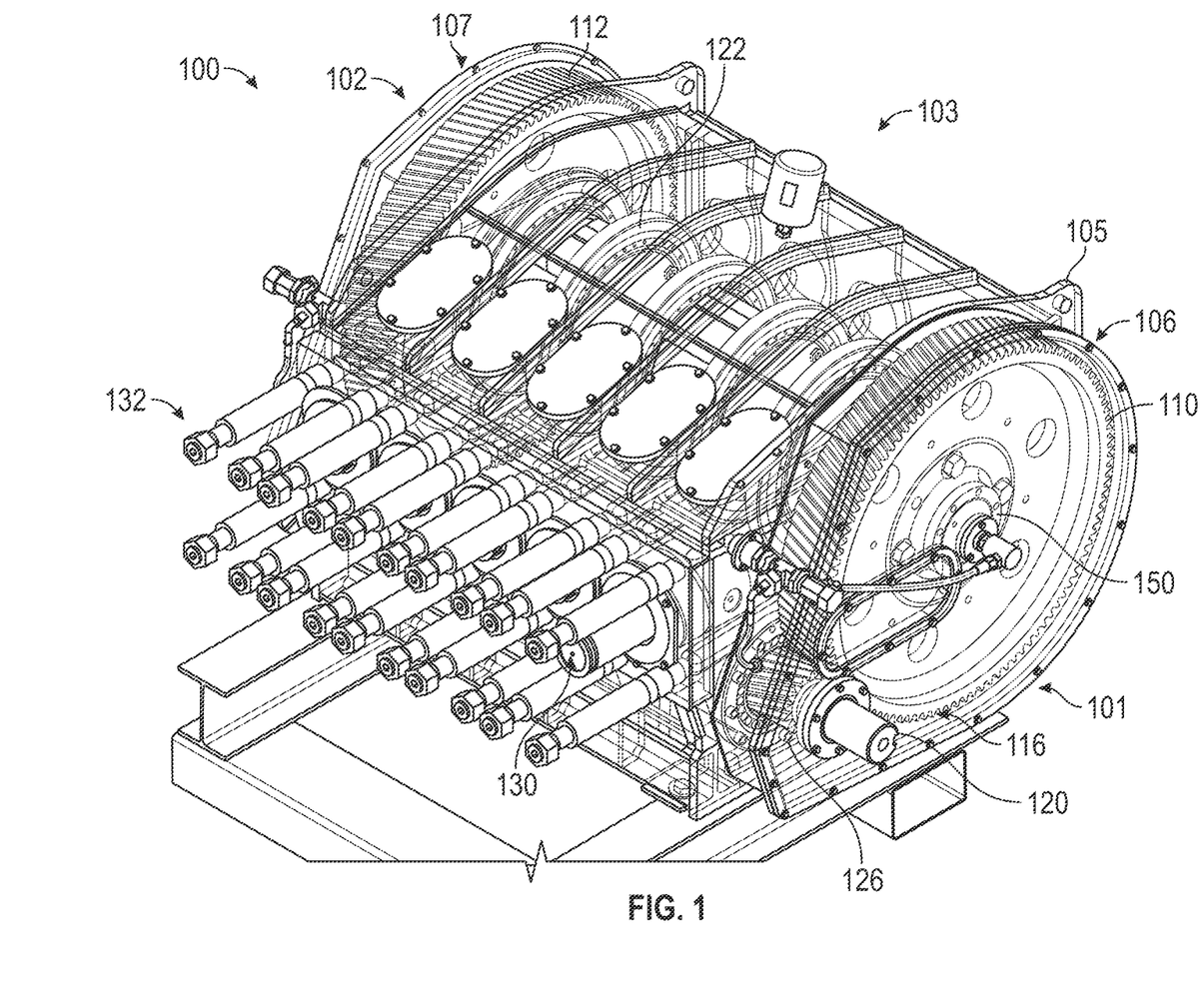
FIGS. 1 and 2 are perspectives view of a power end of a reciprocating pump assembly in which a keyless timing gear assembly is employed to advantage.
Figure 2:
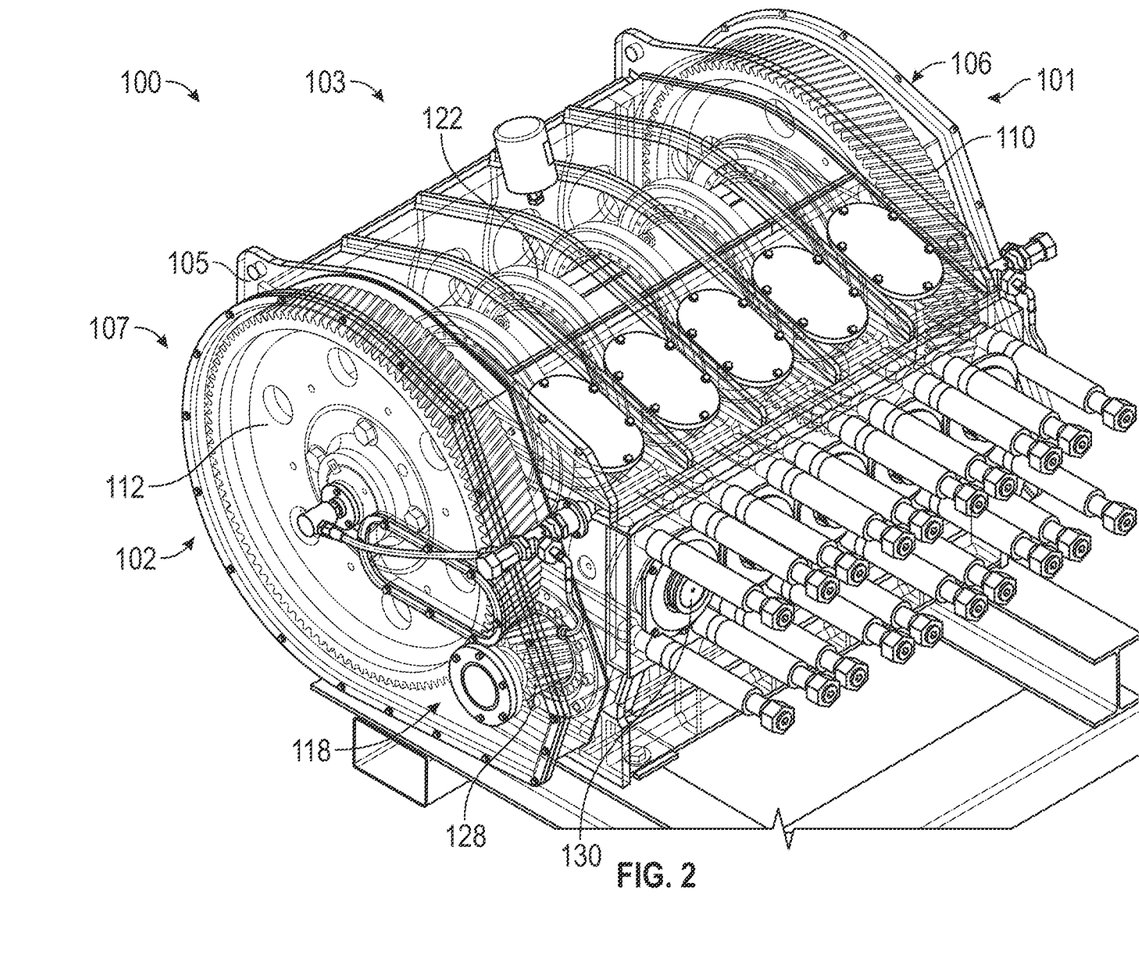

FIGS. 1 and 2 are perspective views of a portion of a reciprocating pump assembly 102, such as, for example, a reciprocating plunger pump, in which a keyless timing gear assembly 150 is employed to advantage. According to embodiments disclosed herein, the keyless timing gear assembly 150 is operable to, as explained in greater detail below, lock a bull gear onto a crankshaft such that no manual offset of the bull gear is required.

Referring to FIGS. 1 and 2, the pump assembly 102 includes a power end housing 105 coupled to a fluid end housing (not illustrated) via a plurality of stay rods 132. The power end housing 105 includes a crankshaft 122 that is mechanically connected to a power source/motor (not shown), which in operation, rotates the crankshaft 122 in order to drive the reciprocating pump assembly 102. In particular, rotation of the crankshaft 122 causes a plunger assembly 130 to reciprocate toward and away from the fluid end housing. In one embodiment, the crankshaft 122 is cammed so that fluid is pumped from a plurality of cylinders in the fluid end housing to minimize the primary, secondary and tertiary forces associated with reciprocating pumps.

In one or more embodiments, the power end 100 includes a pinion gear assembly 134 and generally extends at least partially between a first side 101 (i.e., a drive side) and a second side 102 (the non-drive side) of the power end housing 105. In operation, the pinion gear assembly 134 is coupled to the power source/motor (not shown) to drive the power end 100, as explained in greater detail below.

Figure 3:
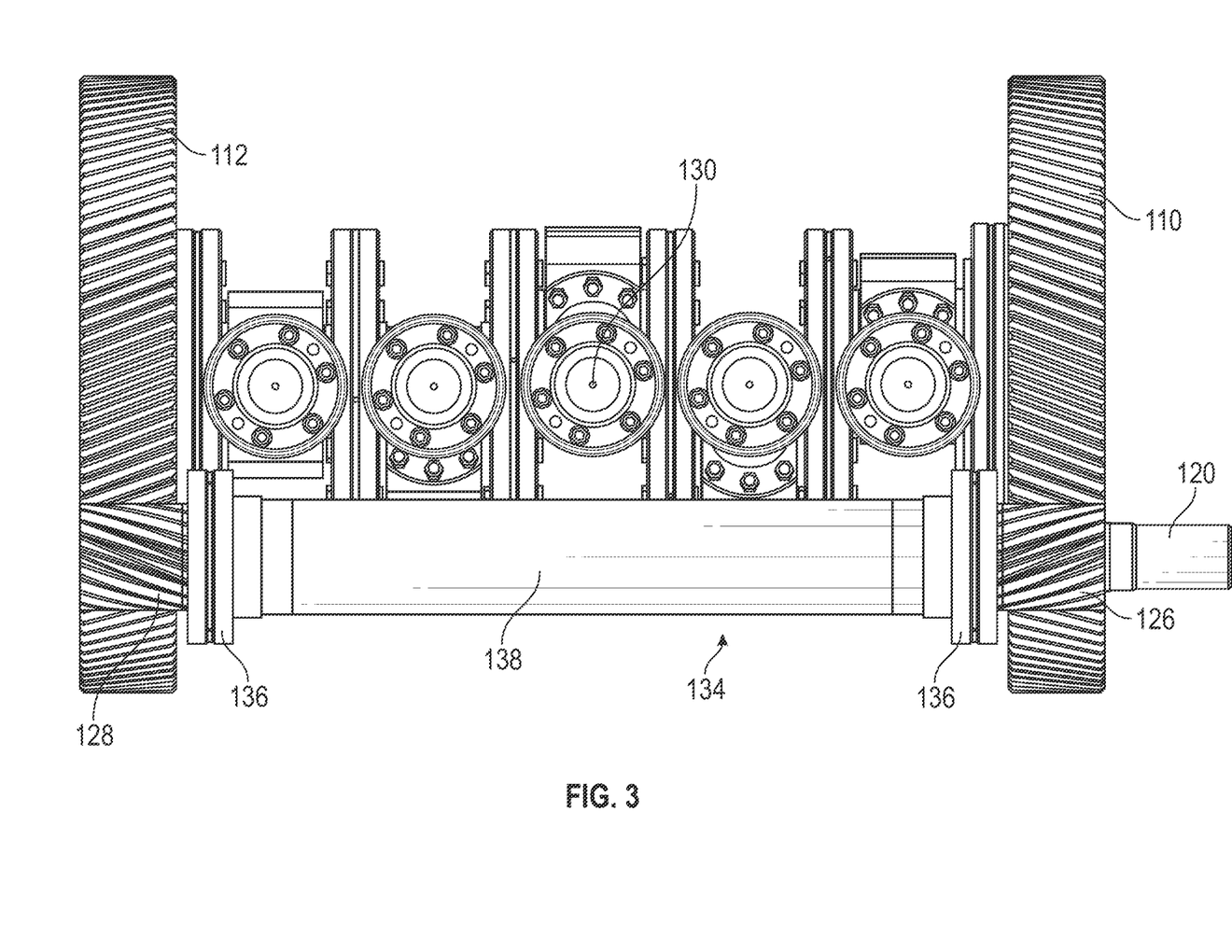
FIG. 3 is a top view of the power end of FIGS. 1 and 2.

Referring specifically to FIG. 3, the pinion gear assembly 134 is illustrated having a pinion shaft 120 and includes a pinion gear 126 and 128 on each end thereof (e.g., on the drive side end and the non-drive side end, respectively, or otherwise spaced apart on the pinion shaft 120) that are configured to mesh with a bull gear 110 and 112, respectively, thereby forming a gear assembly 116 and 118. As illustrated, the gears 110 and 112 are bull gears mounted on the crankshaft 122. In the embodiment illustrated in FIGS. 1-3, a gearbox housing 106 and thus, gear assemblies 116 and 118, are disposed on each side 101 and 102 of the power end housing 105. In operation, the bull gears 110 and 112 are driven by the pinion gears 126 and 128 so as to, as explained in further detail below, rotate the crankshaft 122.

Figure 4:
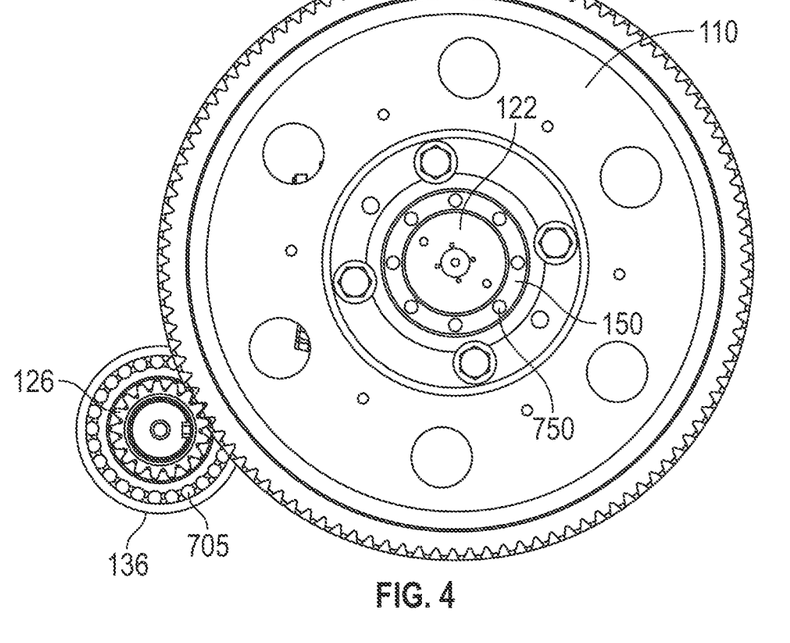
FIG. 4 is a right side view of the power end of FIG. 1.

With continued reference to FIGS. 1-3, the power end 100 further includes a pinion shaft 120 mechanically coupled to the pinion gears 126 and 128, and thus, the bull gears 110 and 112 via the pinion gears 126 and 128. In the embodiment illustrated in FIGS. 1-3, the pinion gears 126 and 128 have opposing gear teeth configured to mesh with corresponding teeth on the bull gears 110 and 112. In some embodiments, the pinion gear 126 and bull gear 110 include a helical profile in an opposite direction of the same helical profile of the bull gear 112 and pinion gear 128 in order to reduce or substantially eliminate axial forces at high load conditions. During operation of the power end 100, the pinion gears 126 and 128 rotate via the pinion shaft 120, which in turn rotate the bull gears 110 and 112 thereby causing the crankshaft 122 to rotate to move the one or more plungers 130 as previously described. With continued reference to FIG. 3, the pinion shaft 120 is mounted within the housing via one or more bearing assemblies 136, which may include one or more ball bearings 705 (FIG. 4).

In order to provide an even distribution of driving power to the crankshaft 120, the bull gears 110 and 112 are disposed on each end of the crankshaft 122 to receive input rotation power from the pinion shaft 120 and pinion gears 126 and 128. Conventionally, both bull gears 110 and 112 use keys to connect to the crankshaft 120 to minimize slippage. However, such configuration requires the keys to be manufactured with high precision to account for the manufacturing variations in the system. For example, errors may build up due to the manufacturing tolerances of the specific bull gears, pinion shaft and pinion gears, crankshaft, and the housing, meaning the keys connecting the bull gears 110 and 112 to the crankshaft may require precise individual manual adjustments or must be precisely machined keys with specific offsets on the key or keyway upon the final assembly. Accordingly, the keyless gear timing assembly 150 is used to address and otherwise minimize these associated problems.

According to one embodiment, the keyless timing gear assembly 150 employs expansion of components to cause compressive stresses to secure the bull gears 110 and/or 112 to the crankshaft 122 in a friction joint to prevent relative rotation therebetween. Thus, the torque transmission is not limited by a shearing limit (e.g., size and material strength) of a key or the keyway. For example and with particular reference to FIG. 6, the bull gear 110 is securely fastened to the crankshaft 122 via at least one actuator 750 that is operable to press a first wedge ring 930 (or simply a wedge, in some embodiments) in and otherwise against an expansion member 910 for securing the bull gear 110 (or 112) to the crankshaft 122. In particular, the actuator 750 causes the wedge ring 930 to move in the direction of arrow 960 relative to the expansion member 910 and press against it, causing it to deform radially (in the direction of arrow 970), simultaneously reducing the inner diameter of the expansion member 910 and increasing the outer diameter of the expansion member 910. In some embodiments, the wedge ring 930 may include individual wedges evenly and radially distributed around a separate ring component. In other embodiments, the wedge ring 930 may have a gap or space in the ring, allowing it to dilate or constrict in response to the forces applied by the actuator 750 and the expansion member 910.

Figure 5:
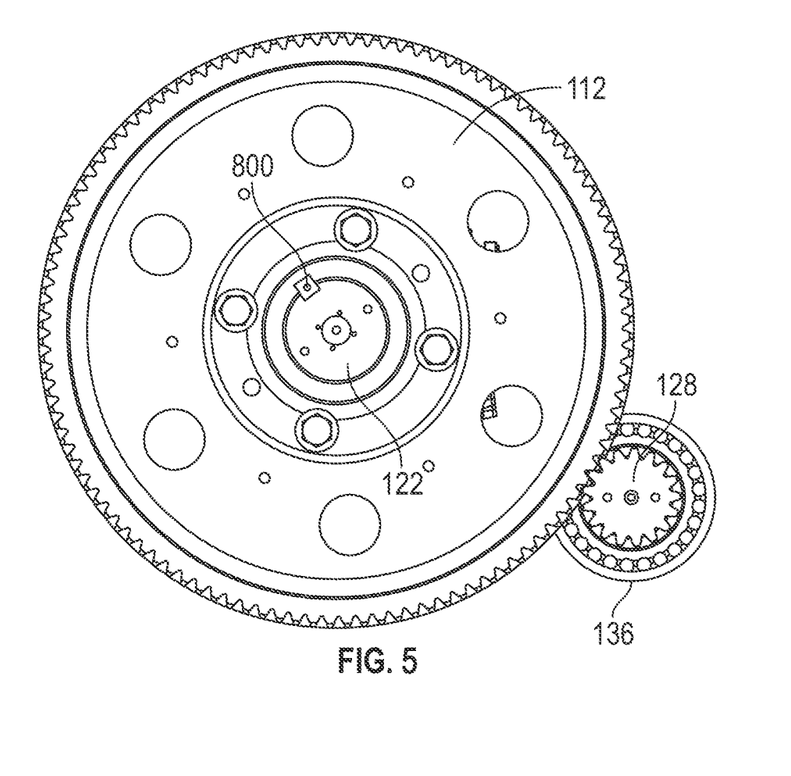
FIG. 5 is a left side view of the power end of FIG. 1.

In the embodiment illustrated in FIG. 5, the power end 100 further includes a shaft key 800 configured to couple the bull gear 112 to the crankshaft 122. The bull gear 110 is synchronized to the second bull gear 112 and locked onto the crankshaft 122 after the bull gear 112 is rotatably fastened onto the crankshaft 122 using the shaft key 800. It should be understood that although a square cross-section shaft key 800 is illustrated, other keys having different cross-sections and other features, such as providing a shear limitation, may be used in the place of a square cross-section shaft key 800.

In use, the first bull gear 110 and the second bull gear 112 are of the same diameter and are synchronized to provide even power input to the crankshaft 122 and to reduce the internal stresses within the crankshaft 122. The synchronization may be achieved by adjusting the first bull gear 110 using the keyless timing gear assembly 150 during assembly to accommodate the combined fitting variations of the second bull gear 112, the pinion gears 126 and 128, and the relative positions between the crankshaft 122, the pinion shaft 120, and the housing 105.

Figure 6:
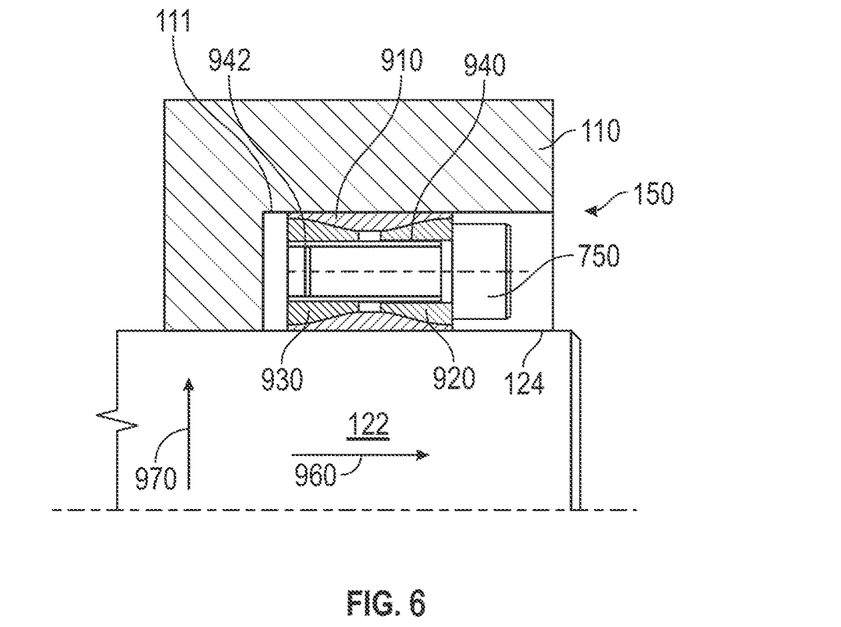
FIG. 6 is a local cross sectional view a keyless gear timing assembly used in the power end of FIG. 1.

In the embodiment illustrated in FIG. 6, the actuators 750 of the keyless gear timing assembly 150 are fasteners that may be threadedly coupled to the first wedge ring 930 at the threaded hole 942. For example, when the fasteners 750 are turned, the threads of the fasteners 750 pull the first wedge ring 930 in the direction of arrow 960 to slidably engage the expansion member 910 along the mating sloped surfaces, causing the expansion member to exert a force radially in the direction of arrow 970 into the interior surface of the first bull gear 110 and in the opposite direction into the exterior surface of the crankshaft 122, thereby creating a friction joint between them and preventing relative movement therebetween.

According to some embodiments, the keyless gear timing assembly 150 may also include a second wedge ring 920 disposed between the fastener 750 and the first wedge ring 930. This configuration causes the second wedge ring 920 to be pressed into the expansion member 910 in the direction of arrow 960 to slidably engage the expansion member 910 along the corresponding sloped surfaces when the fastener 750 is turned. Together with the first wedge ring 930, the second wedge ring 920 thereby pinches the expansion member 910 causing it to expand radially in the direction of arrow 970 against the bull gear 110 and the crankshaft 122, creating a friction joint between and preventing relative movement therebetween.

In some embodiments the actuators 750 are supported by the second wedge ring 920. In such cases, for example, the second wedge ring 920 includes corresponding through holes 940 to receive the actuators 750 therein in order to pass through. Additionally or alternatively, the wedge ring 920 may include other types of openings for the actuators 750, such as a slot.

According to some embodiments, the expansion member 910 may include both an inner portion in contact with the exterior surface 124 of the crankshaft 122 and an outer portion in contact with the interior surface 111 of the first bull gear 110. In operation, the expansion of the expansion member 910 may produce compression stresses and create static friction to secure the first bull gear 110 to the crankshaft 122. In some embodiments, at least a portion of the expansion member 910 is integrally formed from the interior surface 111 of the first bull gear 110. In other embodiments, at least a portion of the expansion member 910 is integrally formed from exterior surface 124 of the crankshaft 122. The integrally formed expansion member 910 reduces the number of moving parts in the keyless gear timing device and may increase the strength of the connection between the crankshaft 122 and the first bull gear 110. In other embodiments, a groove is present in the inner surface of the first bull gear 110 and the expansion member 910 has a corresponding tongue that fits into the groove, securing the expansion member axially to the bull gear 110. In some embodiments, a similar groove and tongue arrangement secures the expansion member 910 to the exterior surface of the crankshaft 122.

Figure 7:
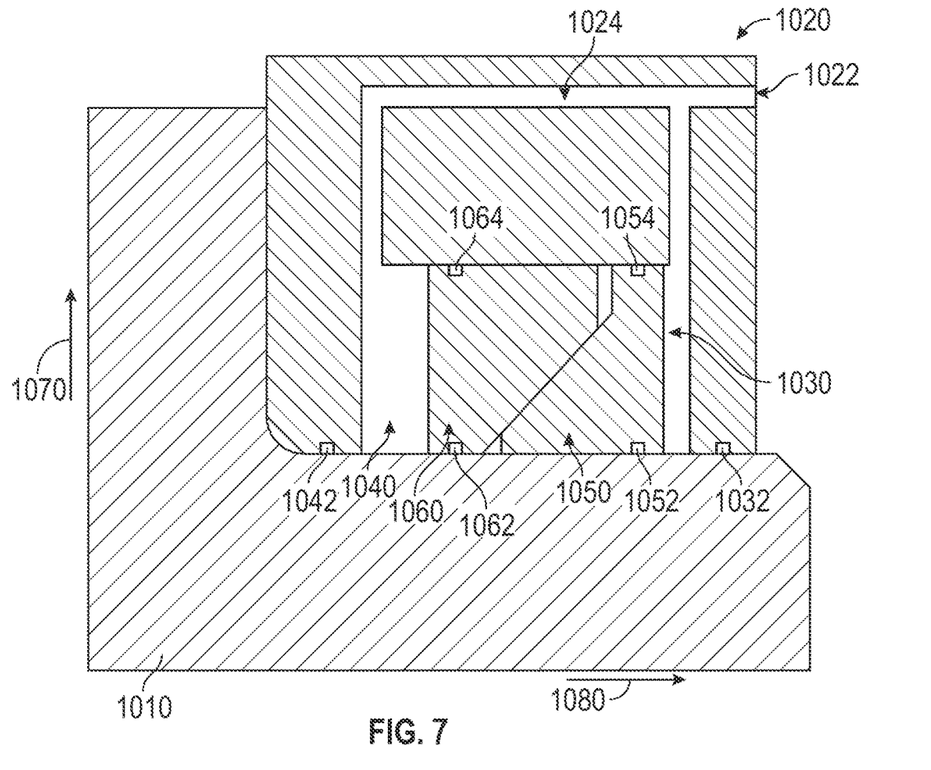
FIG. 7 is a cross sectional view of a portion of a bull gear and a portion of a crankshaft showing a hydraulically activated keyless gear timing assembly.

FIG. 7 illustrates a hydraulically activated keyless gear timing device 150 for securing a bull gear 1020 to a crankshaft 1010. In the embodiment illustrated in FIG. 7, a fluid channel 1024 is formed in a portion of the bull gear 1020 to provide fluid communication between the fluid opening 1022 and a first and second fluid chamber 1040 and 1030. As illustrated, the first fluid chamber 1040 is in fluid communication with a first wedge ring 1060. Similarly, the second fluid chamber 1030 is in fluid communication with a second wedge ring 1050. In operation, the first and second fluid chambers 1040 and 1030 and the fluid channel 1024 are filled with a hydraulic fluid such as water or oil, by way of example. Pressure is applied on the hydraulic fluid by an actuator 750 through the fluid opening 1022, and the pressure is translated to the first and second fluid chambers 1040 and 1030, causing the first wedge ring 1060 to move in the direction of the arrow 1080 to press against and/or otherwise slideably engage the second wedge ring 1050. The first and second wedge rings 1060 and 1050 in turn act against the bull gear 1020 and the crankshaft 1010 respectively in the direction of the arrow 1070 to frictionally secure the bull gear 110 to the crankshaft 122. The hydraulic fluid is controlled and otherwise contained by the placement of seal rings in grooves 1064 located in the first wedge ring 1060, one or more grooves 1052 and 1054 located in the second wedge ring 1050, and grooves 1032 and 1042 located in the bull gear 1020. Additionally, a valve, such as a one-way check valve (not shown), may be secured at the fluid opening 1022 to control and otherwise prevent the hydraulic fluid from leaking out of the keyless gear timing assembly 150 after fluid pressure is removed. Although not illustrated, the keyless gear timing assembly 150 using hydraulic actuation may also employ an expansion member to secure the bull gear to the crankshaft, similar to the expansion member 910 shown in FIG. 6.

The keyless gear timing assembly 150 illustrated in FIG. 4 includes eight actuators 750 symmetrically distributed around a center of rotation. However, different numbers of actuators 750 may be used. For example, the keyless gear timing assembly 150 may include one, two, three, four, five, six, seven, or more actuators 750. In other embodiments, nine, ten, twelve, fourteen, or twenty actuators 750 may be used. The actuators 750 illustrated in FIG. 7 are symmetrically arranged around the center of rotation, but in other embodiments the placement of the actuators 750 may be asymmetrical.

In some embodiments, the interior surface 111 of the bull gear 110 and the exterior surface 124 of the crankshaft 122 are tapered at an angle. Tapering the exterior surface 124 of the crankshaft 122 and the interior surface 111 of the bull gear 110 serves to increase the surface area available for contact by the first wedge ring 930 and the second wedge ring 920, thereby increasing the strength of the connection between the bull gear 110 and the crankshaft 122.

In other embodiments, the interior surface 111 of the bull gear 110 is textured to provide greater friction between the bull gear 110 and the first and second wedge rings 930 and 920 and the expansion member 910. In some embodiments, the exterior surface 124 of the crankshaft 122 may be textured to similar effect. For example, the surfaces may be knurled, banded, grooved, dimpled, bumpy, or otherwise textured.

Figure 8:
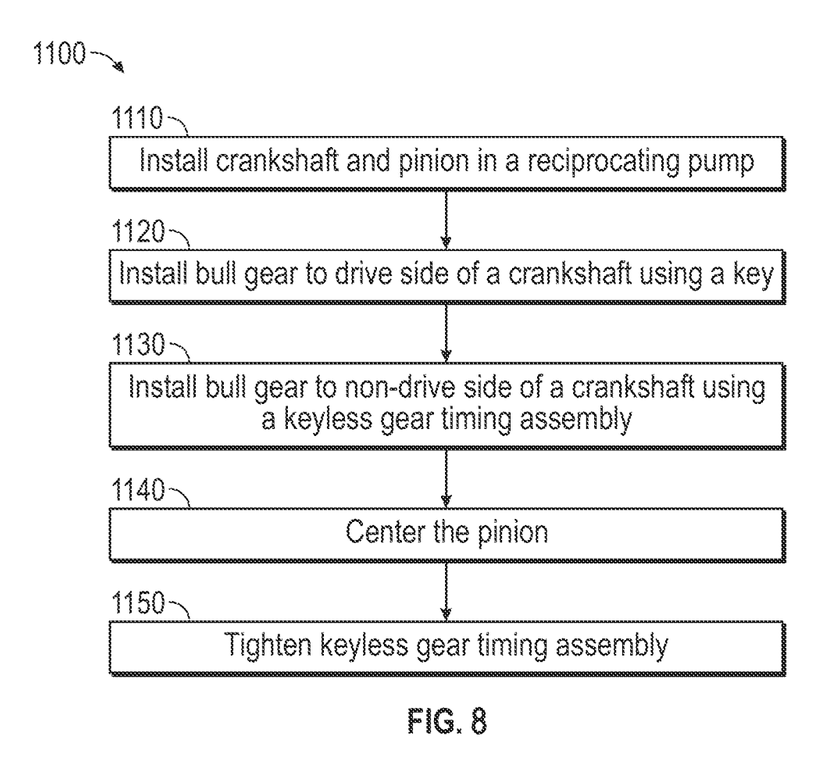
FIG. 8 is a flow chart showing a method of synchronizing two bull gears.

FIG. 8 is a flow chart 1100 showing a method of synchronizing two bull gears, such as the first and the second bull gears 110 and 112. At 1110, a crankshaft and pinion shaft are installed in a reciprocating pump. The crankshaft 122 may be supported or installed on bearings in a housing of a power end 105. At block 1120, a first bull gear 110 is installed onto a first end of the crankshaft using a key 800. At block 1130, a second bull gear 112 is installed onto a second end of the crankshaft 122 using a keyless gear timing assembly 150 as described above. At blocks 1140 and 1150, the pinion shaft 120 is centered so as to ensure proper contact between the pinion gears 126 and 128 and the bull gears 110 and 112 and the keyless gear timing assembly 150 is tightened.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose.

In the specification and claims, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s), as defined solely by the appended claims. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An assembly for securing a bull gear to a crankshaft of a power end of a reciprocating pump assembly, the assembly comprising:
   the crankshaft configured to drive one or more plungers in a fluid end of the reciprocating pump assembly,
   a first bull gear connected to a first end of the crankshaft and a second bull gear connected to a second and opposed end of the crankshaft, wherein the second bull gear is connected to the crankshaft using a key, and
   a pinion shaft mechanically coupled to the first bull gear and the second bull gear via first and second pinion gears, respectively, the pinion shaft operable to rotate the pinion gears, and in turn, rotate the first and second bull gears to rotate the crankshaft,
   a keyless timing gear assembly comprising:
   at least one actuator;
   an expansion member; and
   at least one wedge member disposed between the at least one actuator and the expansion member, the wedge member having a sloped surface to slideably engage a corresponding sloped surface on the expansion member such that in response to actuation of the at least one actuator, the at least one wedge member exerts a force on the expansion member for securing the first bull gear to the crankshaft.

2. The assembly of claim 1, wherein the wedge member is a ring.

3. The assembly of claim 1, wherein the at least one actuator is a threaded fastener threadedly coupled to the wedge member.

4. The assembly of claim 1, further comprising a second wedge member, the second wedge member having a sloped surface to slideably engage a corresponding sloped surface on the expansion member such that in response to actuation of the at least one actuator, the second wedge member exerts a force on the expansion member for securing the first bull gear to the crankshaft.

5. The assembly of claim 4, wherein in response to actuation of the at least one actuator, the distance between the wedge members decreases.

6. The assembly of claim 1, wherein at least a portion of the expansion member is integrally formed with either the first bull gear or the crankshaft.

7. The assembly of claim 1, wherein the at least one actuator is three actuators symmetrically positioned around a center axis of the crankshaft.

8. The assembly of claim 1, wherein the at least one actuator comprises a hydraulic actuator having a channel in fluid communication with the wedge member such that in response to fluid pressure in the hydraulic channel, the wedge member slidably engages the expansion member to cause the first bull gear to frictionally engage the crankshaft.

9. The assembly of claim 8, wherein the expansion member is a second wedge ring hydraulically coupled to the hydraulic actuator through the fluid channel.

10. A power end for a reciprocating pump assembly, the power end comprising:
   a crankshaft configured to drive one or more plungers in a fluid end;
   a first bull gear connected to a first end of the crankshaft and a second bull gear connected to the crankshaft spaced apart from the first bull gear,
      wherein the second bull gear is connected to the crankshaft using a shaft key;
   a pinion shaft mechanically coupled to the first bull gear and the second bull gear via first and second pinion gears, respectively, the pinion shaft operable to rotate the pinion gears, and in turn, rotate the first and second bull gears to rotate the crankshaft; and
   a keyless timing gear assembly for securing the first bull gear to the crankshaft, the keyless timing gear assembly having
      at least one actuator;
      an expansion member; and
      at least one wedge member disposed between the at least one actuator and the expansion member, the wedge member having a surface to slideably engage a corresponding surface on the expansion member such that in response to actuation of the at least one actuator, the at least one wedge member exerts a force on the expansion member for securing the first bull gear to the crankshaft.

11. The power end of claim 10, wherein the first bull gear is synchronized to the second bull gear and locked onto the crankshaft after the second bull gear is fastened onto the crankshaft using the shaft key, and wherein the first bull gear and the second bull gear are of the same diameter and are synchronized to provide even power input to the crankshaft.

12. The power end of claim 10, wherein the at least one actuator is a fastener threadedly coupled to the wedge member.

13. The power end of claim 12, wherein the wedge member is a ring.

14. The power end of claim 12, further comprising a second wedge member, the second wedge member having a surface to slideably engage a corresponding surface on the expansion member such that in response to actuation of the at least one actuator, the second wedge member exerts a force on the expansion member for securing the first bull gear to the crankshaft.

15. The power end of claim 14, wherein in response to actuation of the at least one actuator, the distance between the wedge members decreases.

16. The power end of claim 10, wherein at least a portion of the expansion member is integrally formed with either the first bull gear or the crankshaft.

17. The power end of claim 10, wherein the at least one actuator is a threaded fastener threadedly coupled to the wedge member.

18. A method for synchronizing two bull gears spaced apart on a crankshaft in a power end of a reciprocating pump assembly, the method comprising:
   securing a first bull gear to the crankshaft,
      wherein securing the first bull gear to the crankshaft comprises installing the first bull gear onto the crankshaft using a key; and
   securing a second bull gear to the crankshaft spaced apart from the first bull gear, wherein securing the second bull gear comprises actuating at least one actuator of a keyless gear timing assembly such that in response to actuation, at least one wedge member exerts a radial force on an expansion member for securing the second bull gear to the crankshaft to enable the first bull gear to rotate in synchrony with the second bull gear.

19. The method of claim 18, further wherein the first bull gear is installed on a drive side of the crankshaft and the second bull gear is installed on a non-drive side of the crankshaft.

20. The method of claim 18, wherein the first bull gear is synchronized to the second bull gear and locked onto the crankshaft after the second bull gear is fastened onto the crankshaft using the shaft key, and wherein the first bull gear and the second bull gear are of the same diameter and are synchronized to provide even power input to the crankshaft.

* * * * *